United States Patent
Huang

(10) Patent No.: US 8,613,295 B2
(45) Date of Patent: Dec. 24, 2013

(54) COMBINED HYDRAULIC CONTROL VALVE

(75) Inventor: Renhao Huang, Shanghai (CN)

(73) Assignee: Shanghai Renhao Hydraulic Technology Co. Ltd., Shanghai (CN)

( * ) Notice: Subject to any disclaimer, the term of this patent is extended or adjusted under 35 U.S.C. 154(b) by 185 days.

(21) Appl. No.: 13/148,238

(22) PCT Filed: Feb. 8, 2010

(86) PCT No.: PCT/CN2010/000180
§ 371 (c)(1),
(2), (4) Date: Aug. 5, 2011

(87) PCT Pub. No.: WO2010/091597
PCT Pub. Date: Aug. 19, 2010

(65) Prior Publication Data
US 2011/0297251 A1    Dec. 8, 2011

(30) Foreign Application Priority Data

Feb. 10, 2009    (CN) .......................... 2009 1 0046054

(51) Int. Cl.
*F16K 1/00* (2006.01)
(52) U.S. Cl.
USPC ..................................... 137/884; 137/315.11
(58) Field of Classification Search
USPC ................................ 137/315.01, 315.11, 884
See application file for complete search history.

(56) References Cited

U.S. PATENT DOCUMENTS

| | | | | |
|---|---|---|---|---|
| 3,513,876 A | * | 5/1970 | Tarbox | 137/596 |
| 6,053,198 A | * | 4/2000 | Atkin et al. | 137/315.03 |
| 6,257,277 B1 | * | 7/2001 | McGeachy | 137/599.08 |
| 6,990,999 B2 | * | 1/2006 | Patel | 137/625.64 |
| 7,891,379 B2 | * | 2/2011 | Albrecht et al. | 137/884 |

* cited by examiner

*Primary Examiner* — John K Fristoe, Jr.
*Assistant Examiner* — Reinaldo Sanchez-Medina
(74) *Attorney, Agent, or Firm* — John P. White; Cooper & Dunham LLP

(57) ABSTRACT

A combined hydraulic control valve is disclosed, the valve includes a modularized pilot control valve assembly (101), a modularized two-way cartridge valve control assembly (201), and a valve block body (301); the modularized pilot control valve assembly (101) and the modularized two-way cartridge valve control assembly (201) are connected to the valve block body (301) to constitute the combined hydraulic control valve. The pilot control valve assembly (101) is mounted on the upper mounting surface (14) of the valve block body (301); the two-way cartridge valve control assembly (201) consists of a valve seat main stage (211) and a control cover plate (221) which is assembled at a side of the valve seat main stage (211), and the valve block body (301) has a mounting hole (251) for inserting the valve seat main stage (211) of the cartridge valve control assembly (201).

12 Claims, 4 Drawing Sheets

COMBINED HYDRAULIC CONTROL VALVE

CROSS-REFERENCE TO RELATED APPLICATIONS

This application is a §371 national stage of PCT International Application No. PCT/CN2010/000180, filed Feb. 8, 2010, claiming priority of Chinese Patent Application No. CN 200910046054.0, filed Feb. 10, 2009, the contents of all of which are hereby incorporated by reference into this application.

TECHNICAL FIELD

The present invention relates to a combined hydraulic control valve, particularly, a modular configurable hydraulic control valve combination product.

BACKGROUND

Hydraulic control valves, which are widely applied to hydraulic systems, are used to control direction, pressure and flow of fluid, and significantly influence many industrial movable equipments (such as various machines and vehicles) using hydraulic transmission system.

Traditionally, there are three kinds of hydraulic valves including directional control valves, pressure control valves and flow control valves. One representative kind of these products is plate connection hydraulic control valves having 2 ports (such as check valves, hydraulic control check valves, overflow valves, relief valves, throttle valves, speed adjust valves and so on). According to the technical principles, they are also known as "single element" products. Due to historical reasons, the "single element" valves not only possess simplex function, but also have different internal and external structures along with unnecessary differentiation and distinct discretization. So the higher level of the technology, the more inconvenient they are. For example, when a function of any hydraulic valve in hydraulic systems is changed, it needs to change and redesign the hydraulic system and valve block body as well as supply chain procedure, raising costs, and postponing shipment. Unnecessary differentiation and discretization in the structures and shapes of these products usually cause significant changes in the whole manufacturing process and supply chain procedures, thus, resulting in resource waste, raising production costs as well as the total costs of product. This kind of valves are not suitable for fast-growing technical environment and can not meet requirements for modularization and integration of product structure in modern control technology.

SUMMARY OF THE INVENTION

The present invention provides a combined hydraulic control valve, which can solve the problems existing in current technology in this field.

To solve the problems, the technical solution of the invention is shown as follows:

Provides is a combined hydraulic control valve, which comprises a modularized pilot control valve assembly, a modularized two-way cartridge valve control assembly, and 2 port plate connection valve block body, wherein said modularized pilot control valve assembly and said modularized two-way cartridge valve control assembly are connected to the valve block body, by assemble, to constitute the combined hydraulic control valve; said valve block body is a cuboid-based polyhedron made of high-strength and high performance black metal or nonferrous metal through casting and then machining or from forging pieces or profiles through machining; there are at most two mounting holes in said valve block for inserting the valve seat main stage of said cartridge valve control assembly and at most two mounting surfaces for flanged control cover plate of said cartridge valve control assembly at two sides of the said valve block; and the top surface of said valve block pre-reserves a mounting surface conforming to ISO 4401-02/03 for installing pilot control valves.

The pilot control valve assembly is mounted on the pre-reserved mounting surface on the upper of the valve block body and is fastened through bolts.

There are at most four ports on the mounting surface on the pilot control valve assembly and the valve body.

The two-way cartridge valve control assembly consists of a valve seat main stage and a control cover plate assembling at one side of the valve seat main stage.

The two-way cartridge valve control assembly is mounting on one side surface of the valve block and is fastened through bolts.

The axes of the pilot control valve assembly and two-way cartridge valve control assembly are parallel to each other.

The pilot control valve assembly is a pilot pressure control valve.

The pilot control valve assembly is a pilot solenoid directional valve.

The pilot control valve assembly is a sandwich valve.

The pilot control valve assembly is a pilot proportional control valve.

The two-way cartridge valve control assembly is a directional control cartridge valve.

The two-way cartridge valve control assembly is a pressure control cartridge valve.

The two-way cartridge valve control assembly is a flow control cartridge valve.

The two-way cartridge valve control assembly is a proportional control cartridge valve.

Through appropriate modular configurable way to combine hydraulic control valves, the combined hydraulic control valve of the present invention can replace and realign various 2 port plate connection hydraulic control valves (plate connected 2 ports hydraulic control valves), which are the current mainstream in the field of industrial and movable equipment. The hydraulic control valves of the present invention can conveniently configure without entirely and broadly changing the structures of components of the hydraulic systems and circuit block. So this is good for raising quality and efficiency of design, reducing development time and achieving a better resource-recycle; which allowing to lower the total costs and conveniently acquire customized mass production.

The combined hydraulic control valve of the present invention can not only replace and realign current products, but also create and provide a new hydraulic valve beyond traditional product to meet new and increasing requirements of current industrial machines and movable hydraulic equipments.

DETAILED DESCRIPTION OF PREFERRED EMBODIMENT

Figure 1:
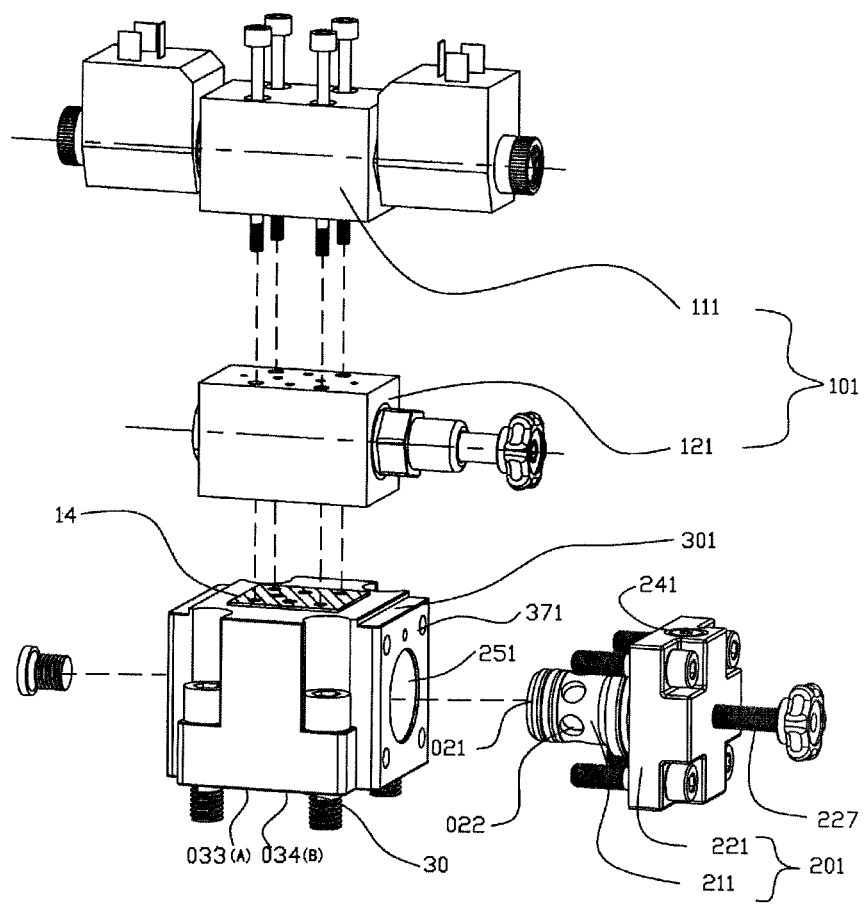
FIG. 1 is a structural schematic of combined electrical pressure control valve product of the present invention.

In order to easily understand the technical approaches, characteristics, functions and effects of the present invention, the present invention is described in detail in associated with the figures.

The present invention comprises one pilot control valve or a set of pilot control valves, one or two slip-two-way cartridge valve control assemblies, and one generally standard 2 port plate connection valve block body. The combined hydraulic control valve of the present invention usually consists of the above-mentioned three main parts. In particular, the present invention provides a combination product of modular and configurable hydraulic control valve.

In the combined products, pilot control valves may have different functions according to specific pilot control requirements, such as, pilot pressure control valves, pilot solenoid directional valves, sandwich valves and pilot proportional control valves. All of them use standard mounting surface conforming to ISO4401-02/03, and preferably ISO4401-02 and CETOP RP121H-4.2-4-P02, thereby allowing pilot control stage in product more reasonable and more compact. The pilot control valves can be commercially available standard products or products with optimization design specially for the combined products of the present invention. As main stage control, the slip-two-way cartridge valve assembly consists of a valve seat main stage and a flanged cover plate. According to the requirements of the main stage control, they have different control functions, such as directional control cartridge valves, pressure control cartridge valves, flow control cartridge valves, proportional control cartridge valves, etc; and the mounting holes for valve seat main stage and the mounting surfaces for flanged cover plate conform to ISO7368 or other similar standards, but depth of mounting hole and distance between mounting holes have significantly decreased. Through specific design and optimization, the valve seat main stage and flanged control cover plate of the combined products are more reasonable and compact than those of commercial products. Through innovation and optimization design, the flanged cover plate and its accessories are more compact and lighter than commercial products. And it has significantly decreased the number of titled holes through especially designed combination plug screw. Therefore, it has solved the traditional problem that is the titled holes are hard to be processed and sealed.

The two-way cartridge valve control assemblies in combined products themselves are a modularized and configurable structure, so they can be used not only in the combined hydraulic control valve of the present invention, but also in the combined hydraulic integrated control valve block system or other kinds of hydraulic control valve blocks. The pilot control valves and their combinations are usually mounted on the standard mounting surface of the valve block body solely or by stacking and respectively fastened by three or four bolts. It can acquire the control through connecting the pilot control ports on the mounting surface and in the two-way cartridge valve and the main ports. The two-way cartridge valves are usually inserting in the mounting holes on one or two sides of the valve block body and fastened by using four bolts to one or two sides flanged cover plate. The seat valve main stage of the two-way cartridge valve has two main ports, one is on the bottom, and the other are equispaced holes on a side of the seat valve main stage. The flanged cover plate can have four pilot control ports at most. The bottom mounting surface of the valve block body have two main ports indicated as A and B, and two control ports indicated as x and y. The control ports are usually connecting to the pilot control ports of the pilot control valve to control the seat valve main stage.

In embodiment of the combined products according to the present invention, the axes of the pilot control valve assembly and two-way cartridge valve control assembly are parallel to each other, which is different from the traditional way, their axis are vertical each other. Meanwhile, the combined products combines a two-way cartridge valve with flanged cover plate, so they can control seat valve main stage of two-way cartridge valves through related mechanism in the flanged cover plate. That means the displacement and position of the valve core of the seat valve main stage along axis a can be detected and monitored. Therefore, it is good for many kinds of control requirements, such as throttling, speed limitation, etc., by adjusting spool stroke, control terminal distance and dynamic spool displacement detect. It can add kinds of pilot control assemblies or other accessories in the flanged cover plate if it is needed. The valve block body is a polyhedral casting based on a cuboid, which uses high strength and high performance of black metal or nonferrous metal to machining after casting or the valve block body is made of forging or profile after machining. The bottom surface of the valve block body is usually mounting surface conforming to ISO standards. The valve blocks use mounting surfaces conforming to ISO5781, ISO6264 when the diameter size is 16 mm or 25 mm. When the size is 10 mm, the valve blocks preferably use mounting surfaces conforming to ISO4401-05 or similar to ISO4401-05. Thus, these specific mounting surface combination may be commonly used with current or new hydraulic control system of other kinds.

Through the combinations or selections of the above mentioned pilot control valves and two-way cartridge valves, it almost can acquire all kinds control functions in hydraulic systems, such as, directional control, pressure control, flow control and multi-control with check valve, etc. According to different requirements, the two main ports on the bottom mounting surface of the valve block body can be connected to high pressure ports (main feed circuit directly from hydraulic pump), secondary high pressure ports (sequence control in hydraulic systems for pressure decline or secondary high pressure ports directly to acator), low pressure ports and secondary low pressure ports of the hydraulic systems (back to oil tank circuit or load-off circuit), so they can acquire many kinds of control functions of any two ports hydraulic circuits. According to the principle of "decomposed circuit design" based on "hydraulic resistance theory", almost all functions of the hydraulic circuits can be acquired by the combinations of just a few valve block bodies with a little difference and optional two-way cartridge valves and pilot control valves. In this way, it just needs a few modularized assemblies to acquire almost all various kinds of control functions. So the present invention is good either for improving the performance of hydraulic system, or for significantly improving the process of the whole production chain, energy and material saving, and reducing total costs.

After a little and partial variation, the product structure solution of the present invention, mostly the valve block body, can use the mounting holes for screw cartridge valve control assemblies. Though the structures of them are different from the cartridge valve control assemblies, the function can be the same. In this way, it can meet various requirements.

The further variation of the valve block body of the present invention can use based flanged mounting surfaces, standard mounting or installation blocks conforming to ISO, SAE and other related standards. The valve blocks can use the above same two-way cartridge valve control assembly or screw cartridge valve control assembly, then are directly installed on hydraulic pump, hydraulic cylinder or integrated products with same connection type. Therefore, this will acquire almost the same functions as the above two systems. After the variation, the valve body of the present invention can conveniently add check (one direction) valves, and then acquire combinations of kinds of hydraulic valves with check valves and special two-way cartridge valves with check valves.

The present invention can not only be used in switch type control and integration, but also in proportional control after using pilot or main stage control assembly with proportional function.

In the present invention for special environment and requirements, such as anti-explosions, fire resistance, corrosion resistance and other special requirements, it can satisfy the requirements by using the appropriate technical measures, which are not complicated.

FIG. 1 is a structural schematic of a combined electrical pressure control valve product of the present invention. The combined electrical pressure control valve mainly consists of a modularized pilot control valve assembly 101, a modularized two-way cartridge valve control assembly 201, and a valve block body 301. The modularized pilot control valve assembly 101 consists of pilot solenoid directional valve 111 and sandwich (stacked) pilot pressure control valve 121. The modularized two-way cartridge valve control assembly 201 consists of a valve seat main stage 211 and a flanged control cover plate 221.

The axis of the pilot solenoid directional valve 111, the sandwich pilot pressure control valve 121 and the spool (valve core) of the two-way cartridge valve seat main stage 211 is parallel with each other. The pilot solenoid directional valve 111 and the sandwich pilot pressure control valve 121 both have one mounting surface, which have four ports at most (see reference number 14 in FIG. 1). The mounting surface firstly conform to ISO4401-02 and CETOP RP121H-4.2-4-P02, cancan conform to CETOP03. In this way, the shape and weight is significantly decreased. It needs four bolts when the mounting surface conforms to ISO4401-02 and three bolts when the mounting surface conforms to CETOP RP121H-4.2-4-P02 to be fasten to the valve block body. According to different requirements, it can use different combinations with the pilot solenoid directional valve 111 and the sandwich pilot pressure control valve 121 to connect the valve block body 301 and the two-way cartridge valve flanged control cover plate 221, then can pre-control the valve seat main stage 211 of two-way cartridge valve 201 is a slip-cartridge structure, is installed in the mounting hole 251, conforming to ISO 7368, but the depth is decreased. The valve seat main stage 211 is fastened by four bolts on the flanged control cover plate 221 in the mounting hole 251 near mouth 034(B) of the right side (see the right side of the figures) of bottom mounting surface of the valve block body. All diameters and small end of the mounting hole 251 meets ISO 7368, but its depth has been decreased deliberately. The control and monitor of the displacement of the spool in valve seat main stage 211 (such as, distance adjustment, terminal distance adjustment, displacement detecting) in the mounting hole 251 can be achieved by setting a distance adjustment rod or a displacement monitoring device in control cover plate 221. In FIG. 1 distance adjustment rod 227 is used. The mounting surface 241 in the flanged control cover plate 221 connects to the flanged mounting surface 371 in the valve block body by bolts and pin holes. The size of connection of the mounting surface 241 is purposely smaller than the size regulated in ISO 7368 standard, so the weight and the size of shape is smaller. The two-way cartridge valve pressure control assembly 201 can configure with different control functional valve seat main stages and flanged control cover plates, and connect with pilot valve and valve block body, then can acquire kinds of functional combinations of hydraulic control valves.

Figure 2:
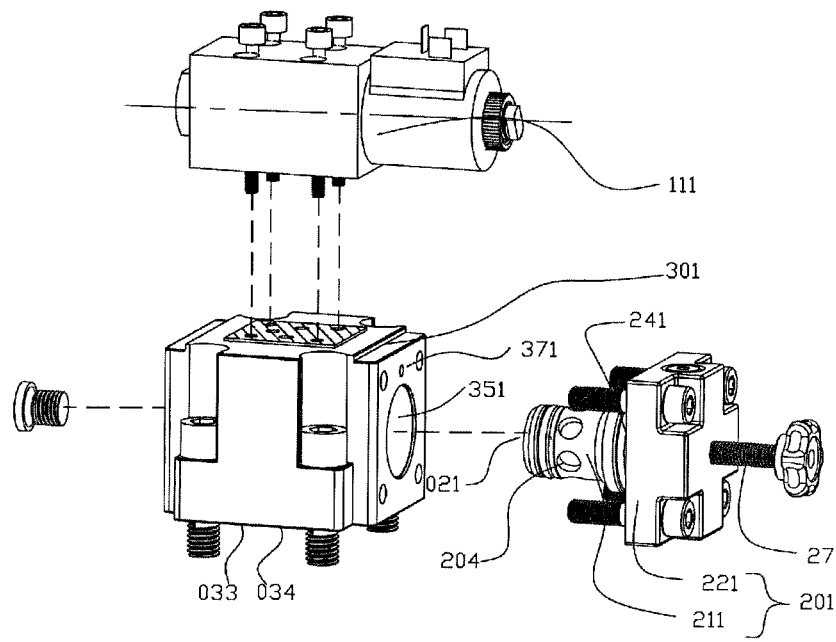
FIG. 2 is a structural schematic of combined two-way electro-hydraulic directional control valve product of the present invention.
Figure 5:
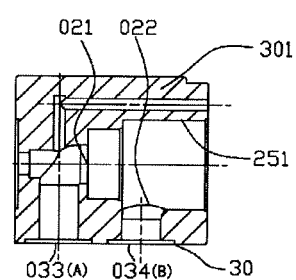
FIG. 5 is a cross section of combined hydraulic control valve block body including a two-way cartridge valve mounting connected (? connection) hole of the present invention.
Figure 6:
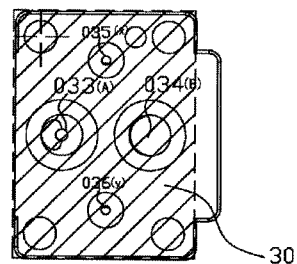
FIG. 6 is an external mounting surface structural schematic of combined hydraulic control valve block body including a two-way cartridge valve mounting connected hole of the present invention.
Figure 7:
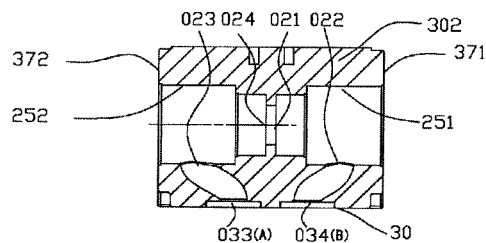
FIG. 7 is a cross section of combined hydraulic control valve block body including two two-way cartridge valve mounting connected holes of the present invention.

FIG. 5 is a cross section of the valve block body 301, and its bottom mounting surface can be seen in FIG. 6 (shadow portion). The valve block body has a mounting hole 251 for two-way cartridge valve, preferably conforming to ISO 5781. According to requirements, the valve block body can be changed to the valve block body 302 having two ports (see in FIG. 7), thus, two mounting holes 251, 252 can be used for two two-way cartridge valves conforming to ISO 6264, 4401 and so on. The above mounting surfaces (external mounting surface) have two main ports 033(A), 034(B) and two control ports 035(x), 036(y). The main ports 033, 034 respectively connect bottom outlet 021 and side outlet 022 of the two-way cartridge valve to form main control circuit/loop (power circuit). So the circuit can connect with external hydraulic circuit system. The control ports 035(x), 036(y) can connect the main channel in valve block body and the control channel in flanged cover plate and pilot control valve for different requirements. The valve block body 301 with two-way cartridge pressure control assembly 201 can combine almost all of control functional two ports hydraulic valves by connecting different channels of hydraulic circuit systems. As in FIGS. 1 and 5, when the main port 033 connects bottom outlet 021 of the two-way cartridge valve to high pressure terminal of hydraulic system (such as input port of hydraulic pump) and the main port 034 connects side outlet 022 of the two-way cartridge valve to low pressure terminal of hydraulic system (such as back channel of oil tank), the appropriate combinations of pilot control valve 101 and two-way cartridge valve pressure control assembly 201 can acquire almost all kinds of functions of hydraulic valves shown in FIG. 1, such as, overflow valves, solenoid overflow valves and back pressure valves. As shown in FIG. 1, when the main port 033 connects bottom outlet 021 of the two-way cartridge valve to high pressure terminal of hydraulic system and the main port 034 connects side outlet 022 of the two-way cartridge valve to secondary pressure terminal of hydraulic system, these appropriate combinations can acquire almost all kinds of functions of hydraulic valves, such as, open relief valves and so on. Similarly, the connections of main ports and the appropriate combinations can form many 2/2 electro-hydraulic directional control valves, including 2/2 electro-hydraulic directional control valves with throttling function (in FIG. 2) and leak-free function. These kinds of hydraulic valves are very rare in traditional products.

Figure 3:
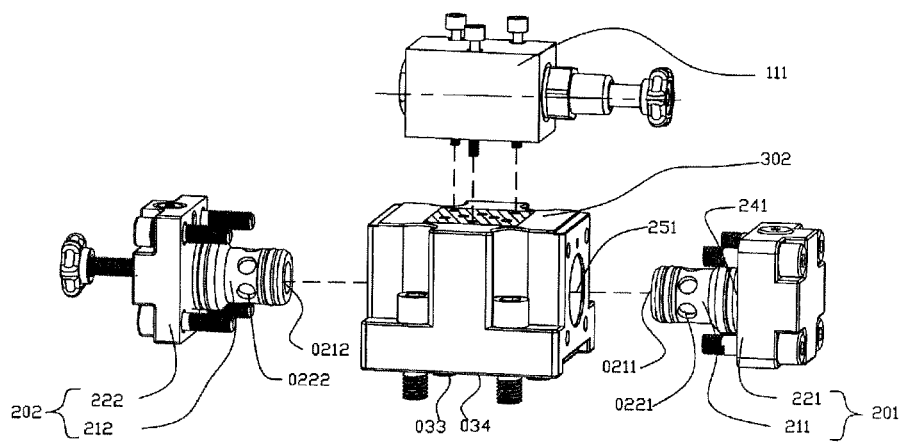
FIG. 3 is a structural schematic of combined two-way flow control valve product with pressure compensation and regulation of the present invention.
Figure 8:
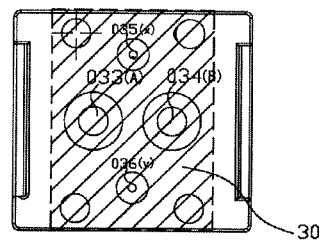
FIG. 8 is an external mounting surface structural schematic of combined hydraulic control valve block body including two two-way cartridge valve mounting connected holes of the present invention.

FIG. 3 is another embodiment. When the main port 034 connects side peripheral outlet 0221 of the two-way cartridge valve to high pressure terminal (stage), another mounting hole 252 is provided (see in FIG. 8) on the left side surface of the valve block body (near port 033). Thus, the valve block body 302 is a variation of the valve block body 301, and its flanged connection surface is shown as 372. The valve block body 302 connects two-way cartridge valve 202 to make the bottom of valve block body connect two-way cartridge valve pressure compensation assembly 201, thus the main port 033 and side outlet 0222 become secondary high (low) pressure output ports. Now the appropriate combinations of two-way cartridge valve pressure compensation assembly 201, two-way cartridge valve throttle assembly 202 and the pilot adjust pressure valve assembly 111 can form many kinds of two-way flow control valve (or adjust flow valve) with kinds of functions, such as pressure compensation, pressure adjustment, etc. These kinds of hydraulic valves are very rare in traditional products.

Figure 4:
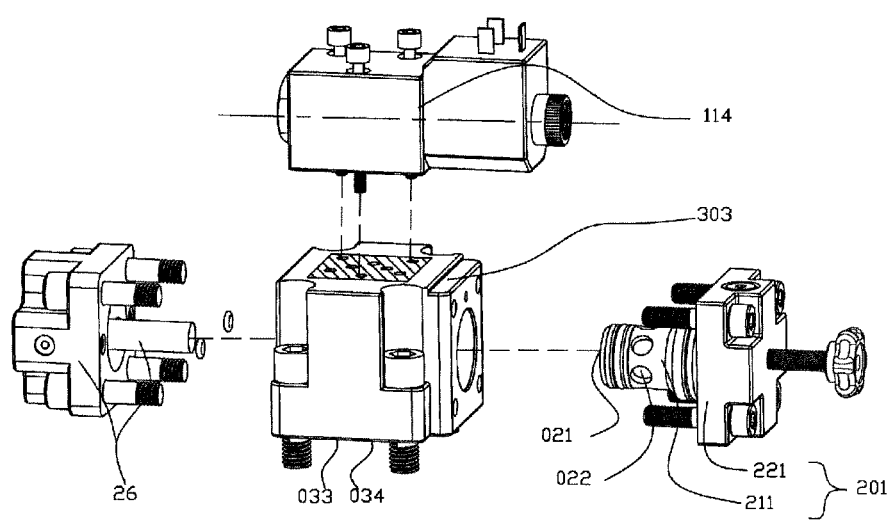
FIG. 4 is a structural schematic of combined hydraulic check valve product with pilot solenoid valve of the present invention.

There is another common way in FIG. 4. The hydraulic valve in FIG. 4 is a partial variation based on FIG. 3. The two-way cartridge valve throttling assembly 202 is changed to rod structure 26 with internal control piston. When the main port 034 is connected to side outlet 022 of two-way cartridge valve directional control assembly 201 and the main port 033 to bottom outlet 021 of two-way cartridge valve directional control assembly 201, then the control ports used control piston is connected with related control ports on the bottom mounting surface of the valve block body through pilot solenoid directional valve 114, the appropriate combinations can form hydraulic valves with solenoid directional check valves, hydraulic control balance valves, and so on. These kinds of hydraulic valves are very rare in traditional products.

Accordingly, it can easily combine all kinds of control function like the current two ports plate connected hydraulic valve products, and provide new combined hydraulic valves, such as, 2/2 electrical hydraulic directional valve, two-way flow control valve with pressure compensation and adjustment and hydraulic check valve with pilot solenoid directional function. The very important valve block bodies just have a few basic patterns and shapes, such as the valve block body 301 in FIGS. 5 and 6 and the valve block body 302 in FIGS. 7 and 8. The valve block body 302 is a partial variation based on the valve block body 301. The valve block body combine a few kinds of the pilot control valves and many modularized two-way cartridge valve assemblies to form almost all kinds of combined hydraulic valve products with modular configurable characteristics. These combined hydraulic valve products not only can replace and realign traditional two ports three kinds valve products, but also can create new kinds of hydraulic control products. So the combined hydraulic valve products of the present invention will overall realign and replace all kinds of traditional products.

Because the structure of kinds of valve block bodies is almost the same, it can arrange some forever or temporary remarkable sign on the spare space or paint the valve bodies with different color to distinguish the valve bodies, which have different internal structure.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed:

1. A combined hydraulic control valve comprising a modularized pilot control valve assembly, a modularized two-way cartridge valve control assembly, and a 2 port plate connection valve block body, wherein
    the modularized pilot control valve assembly and the modularized two-way cartridge valve control assembly are connected to the valve block body to constitute the combined hydraulic control valve;
    there are at most two mounting holes in the valve block for inserting and installing a valve seat main stage of the cartridge valve control assembly, and on two sides of the valve block body there are at most two mounting surfaces used for flanged control cover plates of the cartridge valve control assembly;
    the pilot control valve assembly is mounted on the upper mounting surface of the valve block body and fastened through bolts; and
    the two-way cartridge valve control assembly consists of the valve seat main stage and the control cover plate mounted at a side of the valve seat main stage.

2. The combined hydraulic control valve according to claim 1, wherein there are at most four ports on the mounting surfaces of said pilot control valve assembly and said valve block body.

3. The combined hydraulic control valve according to claim 1 wherein the axes of the pilot control valve assembly and two-way cartridge valve control assembly are parallel to each other.

4. The combined hydraulic control valve according to claim 1 wherein the pilot control valve assembly is a pilot pressure control valve.

5. The combined hydraulic control valve according to claim 1 wherein the pilot control valve assembly is a pilot solenoid directional valve.

6. The combined hydraulic control valve according to claim 1 wherein the pilot control valve assembly is a sandwich valve.

7. The combined hydraulic control valve according to claim 1 wherein the pilot control valve assembly is a pilot proportional control valve.

8. The combined hydraulic control valve according to claim 1 wherein the two-way cartridge valve control assembly is mounted on a side surface of the valve block and fastened through bolts.

9. The combined hydraulic control valve according to claim 8 wherein the two-way cartridge valve control assembly is a directional control cartridge valve.

10. The combined hydraulic control valve according to claim 8 wherein the two-way cartridge valve control assembly is a pressure control cartridge valve.

11. The combined hydraulic control valve according to claim 8 wherein the two-way cartridge valve control assembly is a flow control cartridge valve.

12. The combined hydraulic control valve according to claim 8 wherein the two-way cartridge valve control assembly is a proportional control cartridge valve.

* * * * *